United States Patent
Liu et al.

(10) Patent No.: US 10,212,387 B2
(45) Date of Patent: Feb. 19, 2019

(54) PROCESSING DIGITAL CONTENT

(71) Applicant: IRDETO B.V., Hoofddorp (NL)

(72) Inventors: Annie Liu, Ottawa (CA); Catherine Chambers, Ottawa (CA); Luc Martel, Ottawa (CA); Martin Soukup, Ottawa (CA)

(73) Assignee: IRDETO B.V., Hoofddorp (NL)

( * ) Notice: Subject to any disclaimer, the term of this patent is extended or adjusted under 35 U.S.C. 154(b) by 0 days.

(21) Appl. No.: 14/431,768

(22) PCT Filed: Mar. 28, 2013

(86) PCT No.: PCT/EP2013/056740
§ 371 (c)(1),
(2) Date: Mar. 26, 2015

(87) PCT Pub. No.: WO2014/154288
PCT Pub. Date: Oct. 2, 2014

(65) Prior Publication Data
US 2016/0057380 A1    Feb. 25, 2016

(51) Int. Cl.
*H04N 5/913*    (2006.01)
*H04N 19/88*    (2014.01)
(Continued)

(52) U.S. Cl.
CPC ............. *H04N 5/913* (2013.01); *H04N 19/44* (2014.11); *H04N 19/88* (2014.11);
(Continued)

(58) Field of Classification Search
CPC ........ H04N 5/913; H04N 19/44; H04N 19/88; H04N 2005/91357; H04N 2005/91364; H04N 21/2347; H04N 21/4405
(Continued)

(56) References Cited

U.S. PATENT DOCUMENTS 5,535,275 A * 7/1996 Sugisaki ................ H04N 5/913
380/203
6,728,883 B1 * 4/2004 Kohashi ........... G11B 20/00086
713/165
(Continued)

FOREIGN PATENT DOCUMENTS

CN    1949863 A    4/2007
CN    102804766 A   11/2012
(Continued)

OTHER PUBLICATIONS

Pazarci and Dipcin, IEEE Transactions on Consumer Electronics, vol. 48 No. 2 May 2002.
(Continued)

*Primary Examiner* — Abu S Sholeman
(74) *Attorney, Agent, or Firm* — Rimon, P.C.; Marc S. Kaufman

(57) ABSTRACT

There are described methods and apparatus for scrambling digital content, such as video or audio content, by dividing the digital content into blocks set out in an original arrangement, and reordering the blocks from the original arrangement to a scrambled arrangement. Additional manipulation transforms such as rotations and reflections may be applied to individual blocks. A subsequent compression step may then be carried out. Methods and apparatus for carrying out corresponding descrambling of digital content are also described.

20 Claims, 10 Drawing Sheets

(51) Int. Cl.
*H04N 21/2347* (2011.01)
*H04N 21/4405* (2011.01)
*H04N 19/44* (2014.01)

(52) U.S. Cl.
CPC ..... *H04N 21/2347* (2013.01); *H04N 21/4405* (2013.01); *H04N 2005/91357* (2013.01); *H04N 2005/91364* (2013.01)

(58) Field of Classification Search
USPC .................................. 380/210, 37; 709/201
See application file for complete search history.

(56) References Cited

U.S. PATENT DOCUMENTS

| | | | |
|---|---|---|---|
| 7,050,588 B1 | 5/2006 | Wajs et al. | |
| 2002/0188567 A1* | 12/2002 | Candelore | G06F 21/6218 705/51 |
| 2003/0081836 A1* | 5/2003 | Averbuch | G06K 9/38 382/199 |
| 2005/0041738 A1* | 2/2005 | Lin | H04N 19/176 375/240.03 |
| 2005/0289264 A1* | 12/2005 | Illowsky | G06F 1/3203 710/104 |
| 2006/0026431 A1* | 2/2006 | Campello De Souza | G06T 1/005 713/176 |
| 2006/0071824 A1* | 4/2006 | Kim | G11B 20/00086 341/50 |
| 2007/0006271 A1* | 1/2007 | Janus | H04N 5/85 725/94 |
| 2007/0033419 A1* | 2/2007 | Kocher | G06F 21/10 713/193 |
| 2007/0274687 A1* | 11/2007 | Varekamp | H04N 19/46 386/335 |
| 2008/0002854 A1* | 1/2008 | Tehranchi | G06F 21/10 382/100 |
| 2008/0120676 A1* | 5/2008 | Morad | H04N 21/42607 725/127 |
| 2009/0092184 A1* | 4/2009 | Wu | H04N 19/00521 375/240.01 |
| 2009/0136030 A1* | 5/2009 | Xie | H04N 7/167 380/210 |
| 2009/0190753 A1* | 7/2009 | Watanabe | G11B 20/00086 380/44 |
| 2010/0046628 A1* | 2/2010 | Bhaskaran | H04N 19/103 375/240.24 |
| 2011/0270907 A1* | 11/2011 | Ushiyama | H04L 29/08729 709/201 |
| 2012/0042162 A1* | 2/2012 | Anglin | G06F 21/57 713/165 |
| 2012/0134496 A1* | 5/2012 | Farkash | H04N 7/167 380/210 |
| 2012/0243727 A1* | 9/2012 | Hwang | G06T 1/0085 382/100 |
| 2013/0215978 A1* | 8/2013 | Wu | H04N 19/46 375/240.26 |
| 2016/0057380 A1* | 2/2016 | Liu | H04N 5/913 386/254 |
| 2016/0150231 A1* | 5/2016 | Schulze | H04N 19/132 375/240.12 |
| 2016/0150235 A1* | 5/2016 | Schulze | H04N 19/132 375/240.02 |
| 2016/0269739 A1* | 9/2016 | Tourapis | H04N 19/70 |

FOREIGN PATENT DOCUMENTS

| | | |
|---|---|---|
| EP | 0633703 A2 | 1/1995 |
| JP | H0652633 A | 2/1994 |
| WO | 2014154288 A1 | 10/2014 |

OTHER PUBLICATIONS

International Search Report and Written Opinion cited in corresponding International Application No. PCT/EP2013/056740 dated Jan. 13, 2014.
English Translation of Chinese Office Action dated Nov. 27, 2017 in Chinese counterpart application No. 201380053117.X.

* cited by examiner

| 00 | 01 | 02 | 03 | 04 |
|----|----|----|----|----|
| 10 | 11 | 12 | 13 | 14 |
| 20 | 21 | 22 | 23 | 24 |
| 30 | 31 | 32 | 33 | 34 |
| 40 | 41 | 42 | 43 | 44 |

170

172

| 22 | 04 | 10 | 32 | 11 |
|----|----|----|----|----|
| 03 | 01 | 23 | 02 | 41 |
| 34 | 33 | 00 | 12 | 43 |
| 44 | 20 | 24 | 21 | 40 |
| 31 | 42 | 30 | 13 | 14 |

174

172

178

| 22 | 04 | 10 | 32 | 11 |
|----|----|----|----|----|
| 03 | 01 | 23 | 02 | 41 |
| 34 | 33 | 00 | 12 | 43 |
| 44 | 20 | 24 | 21 | 40 |
| 31 | 42 | 30 | 13 | 14 |

PROCESSING DIGITAL CONTENT

The present application is the United States national stage of International Application No. PCT/EP2013/056740, filed Mar. 28, 2013, the entire content of which is incorporated herein by reference.

FIELD OF THE INVENTION

The invention relates to methods and apparatus for processing digital content, for example to a content source arranged to scramble digital content such as video, and one or more content receivers arranged to descramble the digital content.

BACKGROUND OF THE INVENTION

Various distortion techniques for digital content such as video and audio data are described in the prior art. Such distortion techniques may render the content apparently completely disordered, or may leave it understandable to some extent, depending on what is required by the party distributing the content. Such distortion techniques are often referred to as scrambling, and tend to differ from encryption in that scrambling techniques are more vulnerable to brute force reverse engineering attacks. In most practical applications, the scrambling is added as a further layer of protection or control in addition to encryption.

U.S. Pat. No. 7,050,588 describes a content distortion technique that is applied before a potentially lossy content compression step. After transmission to a receiver, and decoding by the receiver, a receiver restore module corrects the distortions using some control parameters generated during the distortion process. In order to reduce bandwidth the compression scheme may typically remove content elements the effect of which is subsequently undetectable to a human playing back the decompressed content. However, due to the lossy nature of the compression, the restore module operates on slightly different data to that output by the content distortion step, which may lead to residual errors in the content output by the receiver that a human will detect.

Content distortion usually also makes subsequent compression and decompression less efficient. This is because spatial and temporal correlations in the original content which compression techniques take advantage of are reduced or lost. To improve the effectiveness of content distortion techniques, therefore, a tight integration with existing encoder and decoder technologies is often desirable, complicating deployment and the use of hardware acceleration techniques in existing content decoders. Many content distortion techniques are therefore designed to work within or after the compression step, for example by changing the signs or order of DCT coefficient and motion vectors in an MPEG elementary stream.

The invention address problems and limitations of the related prior art.

SUMMARY OF THE INVENTION

The invention provides a content transformation process that subdivides the digital content into a number of smaller elements, which can be referred to as blocks or tiles, which are then placed in a non-standard order, for example for subsequent encoding and transmission to receivers. A specific receiver element, such as a separate descrambling or "fix-up" module, may then be used to implement a reverse transformation, for example after use of a standard content decoder to perform the decoding process. The receiver element reorders the content blocks or tiles back to their original order based on re-ordering control information associated with the scrambled content.

The digital content may, for example, be audio or video data. In an exemplary video variant, a scrambler module splits the original video window into a number of small content elements (blocks or tiles). Each block is a (preferably equal sized) sub window. The scrambler module swaps the blocks according to a mapping scheme using mapping parameters. The receiver descrambling module moves the decoded sub windows (blocks) back to their correct position using an inverse of the mapping scheme, for example based on the same mapping parameters. In a variant scheme, the descrambler module may filter each block to remove a boundary frame (pixel area) around each block that serves to reduce compression/decompression artefacts. In yet another variant, the receiver uses a content stream demultiplexing module that splits the content stream into multiple separate content streams, for example each one carrying a particular block from each of a sequence of frames, and forwards these streams to a set of standard content decoder processes. The output of the decoder processes is then processed by the descrambler (fix up) module.

For audio content, the blocks may be audio time fragments, and the scrambling may then involve moving these audio time fragments to different time locations. As with the video case, the source process may add overlap boundaries to the blocks that are filtered by the content descrambling module (fix up module) in a receiver.

The invention therefore provides a compression-friendly scrambling technique, which can be applied to video such as content before compression, and may be especially useful where compression and decompression codecs which will operate on the digital content are not available for modification. The addition of overlap areas to blocks which include content from the edges of adjacent blocks in the original block arrangement can be used to reduce edge artifacts in the decompressed and descrambled digital content.

In particular, the invention provides a method of processing digital content comprising: scrambling the digital content, the scrambling comprising dividing the digital content into blocks, which may also be referred to as tiles, the blocks being set out in an original arrangement and reordering the blocks from the original arrangement to a scrambled arrangement; and outputting the scrambled digital content with the blocks ordered in the scrambled arrangement. This processing may, for example, be carried out at a source, server, head-end or transmitter, for example for delivery of the digital content to receivers by broadcast, transmission, or written on readable media. The digital content may also be encrypted if required, typically after the scrambling and after any subsequent encoding or compression as discussed below.

The step of scrambling may further comprises carrying out a different transform manipulation on each of a plurality of the blocks, for example involving movements of digital content within a block such as by mirroring or rotation, or by mathematical transformation of digital content data such by colour mapping in various ways.

The scrambled digital content may be encoded, for example including compression before the step of outputting. Such encoding and/or compression may depend on the type of content, for example involving MPEG compression schemes for video and audio data. If the digital content comprises a series of frames (for example video or audio frames), and the step of dividing divides each frame into groups of one or more blocks with the grouping of blocks into these groups persisting across the series of frames, then the step of compressing or encoding may be carried out using a separate compression or encoding process for each group of one or more blocks across the series of frames. For example, a separate compressions or encoding process may be used for each block of a frame.

The step of scrambling may comprise dividing the digital content into blocks which overlap with each other, for example such that at least some of the blocks include at least one overlap area containing digital content from an adjacent edge of at least one respective adjacent block, where adjacent is in terms of the original arrangement of blocks before reordering. To help improve efficiency of compression and reduce edge artifacts between blocks in the descrambled data, the blocks including overlap areas may be sized to correspond to the macroblock size which is to be used in subsequent compression of the scrambled digital content.

The digital content may be audio content, video content, or of other types. If the digital content is video content comprising a plurality of video frames, then the scrambling may comprise dividing each video frame into a plurality of blocks. Blocks may be reordered within a single frame, or additionally across two or more frames. Typically, each block will correspond to a contiguous plurality or area of pixels of a video frame, although note that a block may carry content data for a particular interlace field, or a particular colour field.

The output scrambled (and typically encoded/compressed) digital content may be delivered to one or a plurality of receivers (or clients) which are also provided with descrambling information enabling the receivers to unscramble the scrambled digital content. Such descrambling information therefore includes data permitting a receiver to reverse the block reordering, and to reverse any transform manipulations which have also been carried out. This data may be delivered in various ways as parameters of the mapping scheme, for example combined in a content stream or other digital content format with the scrambled data, and for example obfuscated for example by encryption.

The invention therefore also provides a method of processing digital content comprising: receiving the digital content as scrambled digital content in which blocks of the digital content have been reordered before receiving, from an original arrangement to a scrambled arrangement; descrambling the digital content, the descrambling comprising reordering the blocks back to their original arrangement; and outputting the reordered blocks in their original arrangement. For example, the output reordered blocks may be combined into a video or other content stream for display or playback at the receiver or elsewhere. The received scrambled content may have been handled or have properties as discussed above or as described elsewhere in this document. If the digital content has also been encrypted then a suitable decryption step is also carried out at the receiver. The descrambling may be carried out using descrambling information as mentioned above where some different ways of delivering this information are noted. The descrambling information may be received from the entity which carried out the scrambling or from some other entity.

A different transform manipulation may be applied to each of a plurality of the blocks of the received digital content before being received, and the step of descrambling may then further comprise reversing the transform manipulations.

If the scrambled digital content was compressed or encoded before arriving at the receiver, the method may further comprise decompressing or decoding the scrambled digital content. If the digital content comprises a series of frames (for example video or audio frames), and each frame comprises a group of one or more blocks with the grouping of blocks into these groups persisting across the series of frames, then the step of decompressing or decoding may be carried out using a separate decompression or decoding process for each group of one or more blocks across the series of frames. For example, a separate decompression or decoding process may be used for each block of a frame.

If at least some of the blocks of the received scrambled digital content include at least one overlap area containing digital content derived from at least one respective adjacent block which was adjacent according to the original arrangement, then the method may further comprise modifying the received blocks to remove the overlap area before outputting the reordered blocks in their original arrangement. This can be done in various ways, for example by simply discarding the overlap areas, or the overlap data can be used to improve the output digital content for example by modifying the digital content of each respective adjacent block by combining the digital content the respective adjacent block with digital content of a corresponding overlap area. The overlap data and the overlapped data can be combined for example using weights which may be dependent upon the position of the relevant overlap pixels, or by using a suitable filter, such as a spatial pixel based filter for video content.

The invention also provides apparatus arranged to put the discussed methods into effect. For example such apparatus may provide a source, such as a head-end, a server or a transmitter, arranged to process digital content for output by transmission, broadcast or other forms of delivery and including a scrambler arranged to divide the digital content into blocks set out in an original arrangement and reordering the blocks from the original arrangement to a scrambled arrangement. Such apparatus may also provide a client, such as a receiver or player, arranged to process digital content received from an above source, and including a descrambler arranged to reordering the blocks back to their original arrangement. Such a client could be implemented for example as a PC or tablet computer, as a telephone, set top box, optical disk player or in other ways. The invention also provides a system comprising at least one such source and one or more such clients.

The invention also provides a software application corresponding to the described methods and apparatus, and corresponding computer readable media, for example a computer readable medium carrying computer program code arranged to put such a software application into effect on a computer device.

BRIEF DESCRIPTION OF THE DRAWINGS

Embodiments of the invention will now be described, by way of example only, with reference to the accompanying drawings of which:

FIG. 4 shows how blocks 172 of a frame of video data may be scrambled from an original arrangement 170 to a scrambled arrangement 174, and how overlap areas 178 may be added to the edges of the blocks;

DETAILED DESCRIPTION OF EMBODIMENTS OF THE INVENTION

Figure 1:
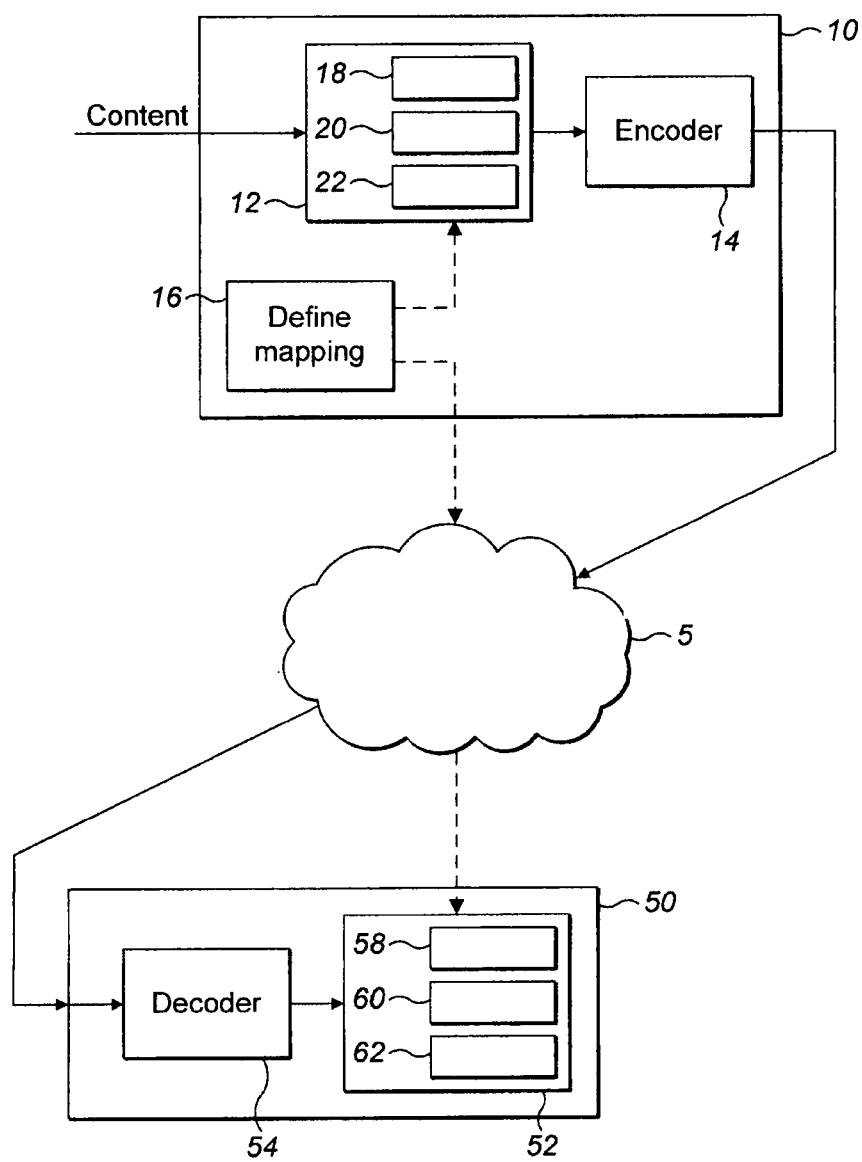
FIG. 1 shows a system for delivering content from a source including a scrambler 12 to one or more receivers including a descrambler 52.

Referring now to FIG. 1, there is illustrated a system for transmitting and receiving digital content comprising a source 10 and one or more receivers 50. The source prepares the content for transmission to the one or more receivers, for example as one or more unicasts or broadcasts over a transmission medium 5 such as a data network, a terrestrial or satellite TV or radio broadcast, or using a data storage medium such as a CD, DVD or other persistent digital data memory.

The source 10 comprises a scrambler 12, an encoder 14 and a define mapping function 16. The scrambler 12 comprises a scrambler reordering function 18. Digital content is received at the source 10 and is passed to the scrambler 12. The scrambler reordering function 18 considers the content as divided into a plurality of blocks which are found in the received digital content in an original arrangement, and reorders the blocks into a scrambled arrangement which is passed to the encoder 14 for encoding, after which the content is output by the source 10. The encoder 14 may, for example, be arranged to carry out compression of the content, for example being an MPEG encoder arranged to structure the content into an MPEG stream. Examples of ways in which the content may be divided into blocks are discussed below.

The scrambler reordering function 18 reorders the blocks of the content according to a mapping scheme defined by the define mapping function 16. The mapping scheme may be communicated to the scrambler, for example, using mapping parameters generated by the define mapping function 16 and passed to the scrambler 12. Detailed examples of mapping schemes will be discussed below. The define mapping function may be located elsewhere than in or at the source. The scheme may also be communicated to the receiver, for the purpose of descrambling the content, also using mapping parameters, although the actual parameters passed to the scrambler in the source and to the receiver need not be the same as long as sufficient information for descrambling the scrambled content is communicated to the receiver 50. The mapping parameters or other data communicating the mapping scheme to the receiver 50 may be sent to the receiver in various ways, for example using the same or a different transmission medium, in combination with or separate to the encoded scrambled content.

The receiver 50 comprises a decoder 54 and a descrambler 52. The decoder 54 may, for example, be arranged to carry out decompression of the content, for example being an MPEG decoder arranged to accept an MPEG stream and extract components of that stream. The decoded content is passed to the descrambler 52 which comprises a descrambler reordering function 58 arranged to reorder blocks of the content back to their original arrangement. The reordering therefore uses the mapping scheme (in a reverse manner) already defined by the define mapping function 16, which may have been communicated to the descrambler for example using mapping parameters as discussed above. The receiver 50 then outputs the decoded and descrambled content, for example for reproduction on a video or audio reproduction device.

As illustrated in FIG. 1, the scrambler 12 at the source 10 may further comprise a boundary generation function 20 and/or a scrambler transform function 22. The boundary generation function 20 extends one or more boundaries of at least some of the blocks so as to overlap with boundaries of one or more other, adjacent blocks, which are adjacent in the original arrangement. Typically, but not necessarily, all of the blocks may be extended in this way to overlap adjacent blocks and thereby provide overlapping boundary regions in each block where content data is duplicated between the adjacent blocks. The receiver 50 then includes a complementary boundary removal function 60 which enables the content to be reconstructed at the descrambler 52 omitting the overlap between blocks. An advantage of using overlaps between adjacent blocks in this way is that edge artifacts between adjacent blocks, which can arise as a result of processing of the content as blocks by the encoder 14 and decoder 54, can be reduced in the content output by the descrambler. This may be in part because the edge artifacts are strongest in the overlapping parts of the blocks which are removed by the descrambler, but additionally the scrambler may jointly use corresponding overlapping parts of adjacent blocks in a filtering or similar step carried out by the boundary removal function, examples of which will be discussed later.

The scrambler transform function 22 may apply one or more transform manipulations to one or more of the blocks, the transform manipulations being specified for example by the mapping scheme defined by the define mapping function. The detail of the transform manipulations may be communicated to the scrambler 12 by the mapping parameters already discussed above. Suitable transform manipulations will depend on the kind of content being processed, but for video data could include colour mapping, image mirroring and image rotation for a particular block. Some Suitable transform manipulations are discussed in more detail below. The transform manipulations carried out by the scrambler transform function 22 are reversed in the receiver by the descrambler transform function 62.

Figure 2A:
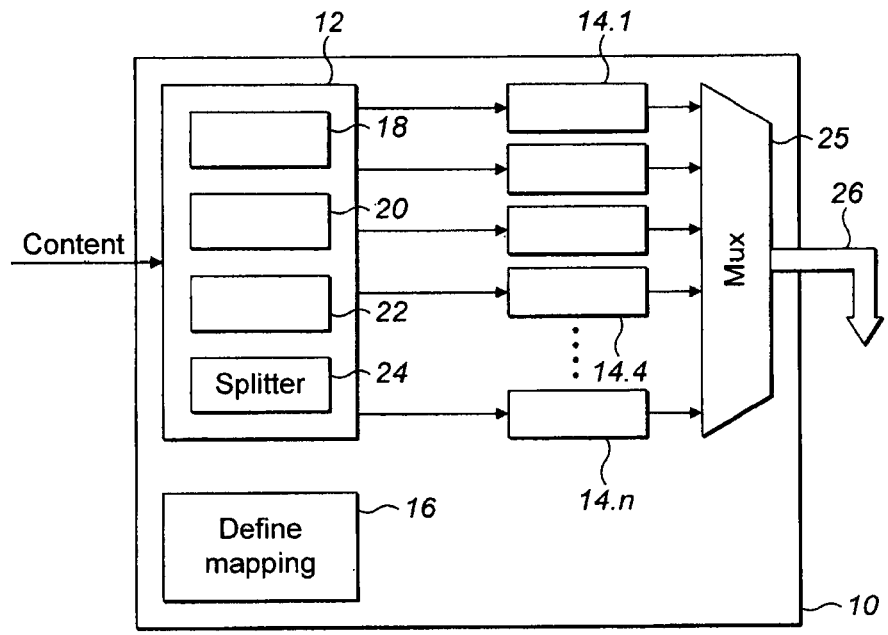
FIG. 2A illustrates how the source may be configured to use multiple encoder processes and to form a multiplexed content stream.

FIG. 2A illustrates in more detail one way in which the output of the scrambler 12 of FIG. 1 may be encoded and formed into a content stream for delivery to the receiver 50. According to FIG. 2A, multiple content blocks processed by the scrambler 12 (including reordering by the scrambler reordering function 18, manipulation by the scrambler transform function 22, and boundary generation by the boundary generation function 20 as required) are split into corresponding multiple elementary streams by splitter function 24, which passes each such stream to a separate encoder processes 14.1-14.n. If, for example, the content is grouped into frames, and each frame is divided by the scrambler into blocks, then each of the separate encoder processes may be allocated to a separate one of the blocks in a particular or in each frame, although other distributions of blocks to encoder processes may be used. Following encoding of blocks by the encoder processes 14.1-14.n, the outputs of the encoder processes are then combined using a multiplexer 25 into a single content stream 26. If the encoder processes are MPEG encoder processes then the multiplexer may combine the encoded blocks into a single MPEG content stream.

Regardless of the encoding and content stream type, the multiplexer may also combine into the content stream 26 the mapping parameters or other data provided by the define mapping function 16 or scrambler 12 for transmission to the receiver 50 for use in descrambling the content. Typically, the mapping parameters or other data so included will be protected within the stream, for example by encryption, so that only suitably authorised receivers are able to recover the mapping parameters or other data. Ways in which this protection can be achieved are familiar to the skilled person, for example from the prior art relating to digital rights management and similar areas of technology.

Figure 2B:
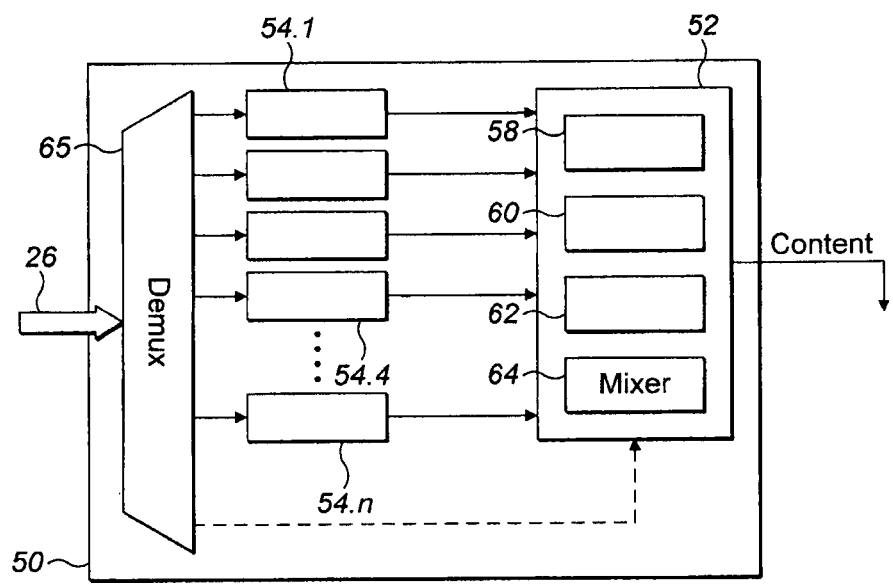
FIG. 2B illustrates how the receiver may be configured to use multiple decoder.

FIG. 2B illustrates how a content stream 26 generated by a source 10 arranged as shown in FIG. 2A may be handled by a suitably adapted receiver 50. In particular, the receiver 50 of FIG. 2B includes a demultiplexer 55 for splitting the separate blocks from the content stream 26 into separate elementary streams, and delivering these to separate decoder processes 54.1-54.n (for example MPEG decoder processes). The elementary streams of decoded blocks are then passed to the descrambler 52 where a mixer function 64 combines the streams and the blocks are processed as discussed above and elsewhere in this document. Note that demultiplexing is a common operation in content delivery systems, and may well already be supported by the standards related to the particular content format.

Separating each block of a frame into separate content stream and using separate encoder and then decoder processes for each block as discussed above may improve the independence of the scrambler and descrambler (and the independence of the reordering and block transform manipulations) from the implementation details of the encoder and decoder. To implement the scrambler and descrambler with a single encoder process and a single decoder process may require the scrambler/descrambler to be implemented with more consideration for the particular encoder/decoder to be used. For example, video content containing reordered blocks has very prominent edges between the blocks which are difficult to encode well with most video encoders carrying out compression, leading to noticeable artifacts around the block edges after decoding. The use of overlapping block boundaries implemented for example using the boundary generation function 20 and boundary removal function 60 of FIGS. 1, 2A and 2B may reduce the artifacts to a level where a single encoder and decoder process can be used for all of the blocks of a frame, because much of the edge artifact distortions will be contained in the overlapping boundaries.

If single encoder and decoder processes are used to encode/decode multiple blocks of a frame, then advantageously the shapes and sizes of the blocks and/or of the overlapping boundary areas may be chosen in order to best reduce edge artifacts resulting from the coding and to optimize bandwidth of the resulting scrambled and encoded content. Details of the encoder and decoder may therefore largely determine the optimum dimensions for blocks and boundary areas.

Figure 3:
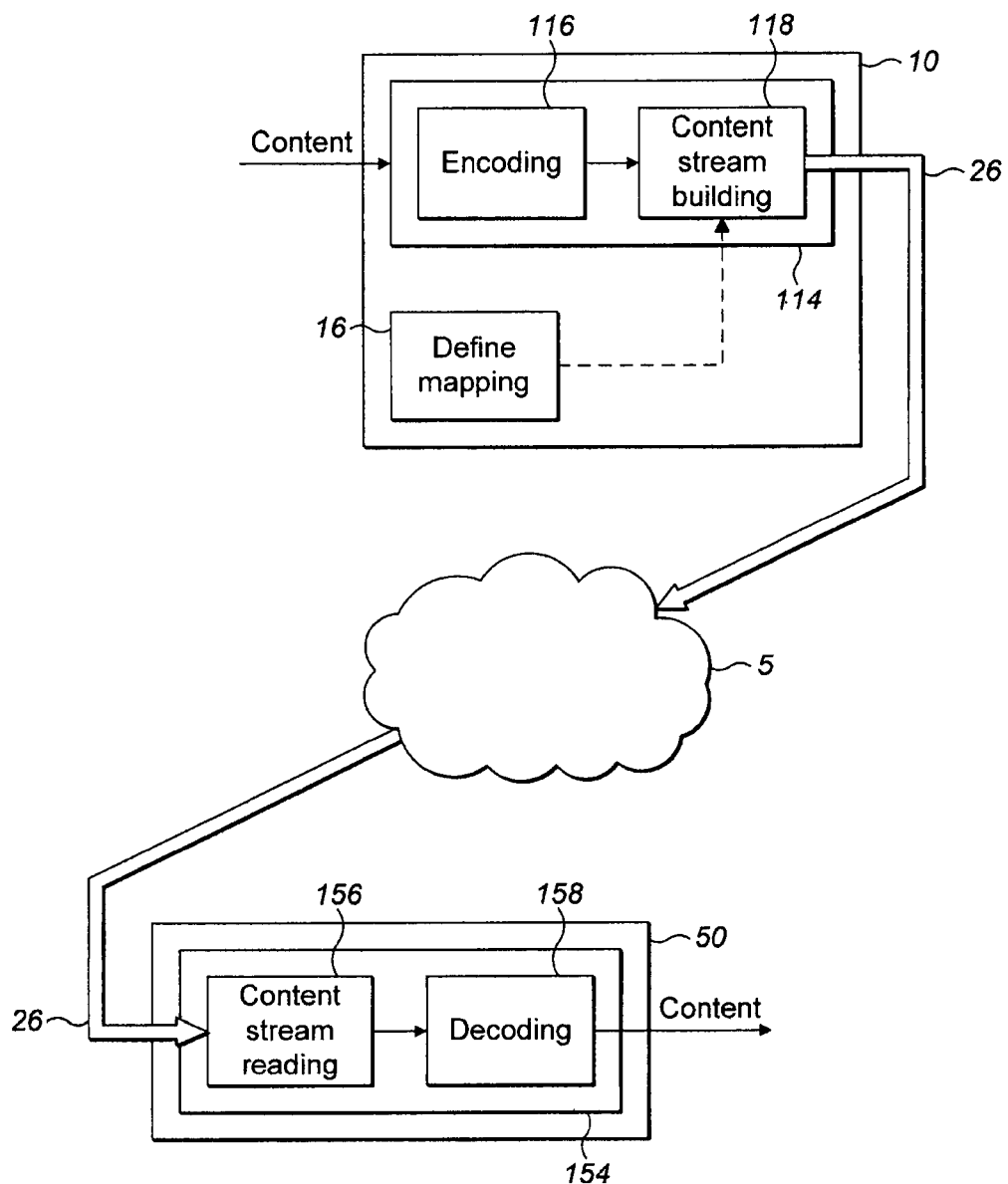
FIG. 3 shows a system for delivering content in which scrambling and descrambling are integrated into the encoder and decoder of the source and receiver respectively.

In FIGS. 1, 2A and 2B the mapping scheme is applied to the content by the scrambler 12, and the scrambled content is subsequently passed to one or more encoders for encoding. In the arrangement illustrated in FIG. 3 the scrambling at the source 10 is instead integrated into the encoder 114. An encoding process 116 operates on the content before any block reordering or transform manipulation has taken place, and instead the block reordering and transform manipulation is carried out as part of a content stream building process 118 to yield content stream 26 according to a mapping scheme defined by the define mapping function 16 as already described. The encoder 114 may add some additional encoded data to provide optimal results after the mapping scheme has been reversed in the receiver 50. At the receiver 50 the decoder may incorporate descrambling of the content into the decoder 154, according to the mapping scheme, as part of a content stream reading function 156 before the content is passed to decoding function 158 for decoding and output.

FIG. 4 illustrates how video content may be handled as blocks by the scrambler 12 and descrambler 62. Frame 170 of FIG. 4 shows a single video frame divided spatially into 25 blocks 172, numbered for convenience and clarity. Other numbers of blocks 172 could be used for a single video frame, for example from 10 to 10 000 blocks per frame may be found suitable in various implementations. Each block preferably contains data relating to a contiguous group of pixels. Although shown as rectangles of the same size as each other in frame 170, the blocks need not be rectilinear in shape, and need not be all the same shape and/or size within a single frame or between frames. Moreover, a block may contain data relating to one or more than one chroma and/or luma groups corresponding to a particular sampling or subsampling scheme used for the video content, and may contain data relating to just one or both fields of an interlaced video scheme if used for the video content.

Whereas frame 170 illustrates the blocks of a video frame in an original arrangement corresponding to the content received by the source 10, frame 174 shows the same blocks 172 of the video frame following reordering by the scrambler reordering function 18 according to a mapping scheme defined by the define mapping function 16. The mapping scheme defines the mapping between the original arrangement of frame 170 and the scrambled arrangement of frame 174. A simple example of such a scheme could include a look-up table which links the position of a block according to the original arrangement of frame 170 with the position of the corresponding block according to the scrambled arrangement of frame 174.

Frame 176 of FIG. 4 shows the same scrambled arrangement of blocks as found in frame 174 after the boundary generation function 20 has extended the blocks to add overlapping areas 178 corresponding to content from the adjacent edges of adjacent blocks. This results in a slightly larger frame size, but as discussed above the descrambler 62 in the receiver 50 removes the overlapping boundaries 178. The boundaries help to keep encoding artifacts from being visible after the overlapping boundaries have been removed by the boundary removal function 60.

Figure 5:
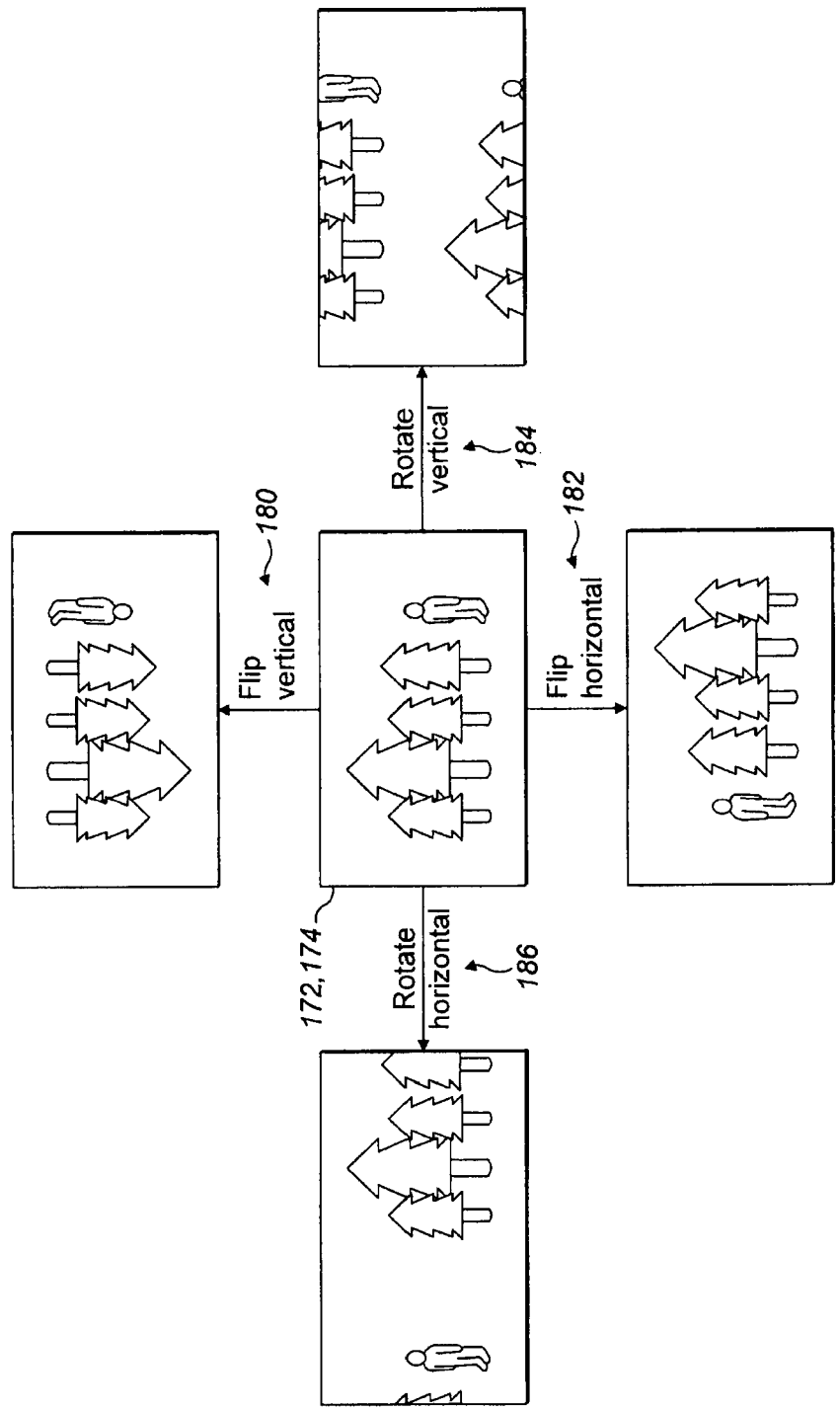
FIG. 5 illustrates further manipulation transforms which may be applied to the blocks 172, 174 as part of the scrambling process.

FIG. 5 illustrates some of the transform manipulations of individual blocks 172 which may be carried out in respect of video or other two dimensional data by the scrambler transform function 22, and correspondingly reversed by the descrambler transform function 62, according to the mapping scheme defined by the define mapping function 16. Similar transform manipulations may be carried out on other kinds of data. The transform manipulations shown in FIG. 5 include vertical 180 and horizontal 182 flipping (mirroring) of a block of video pixels, and vertical 184 and horizontal 186 rotations (directional shifts with wrap-around of image data) of a block of video pixels.

Transform manipulations which remap values for individual pixels without moving those pixels can also be used, for example by changing colour, luminance and/or chrominance values of pixels using an invertible transform. Some examples of such transform manipulations are set out in Pazarci and Dipcin, IEEE Transactions on Consumer Electronics, Vol. 48 No. 2 May 2002. In another such transform manipulation which may be used to change colours of the video to be scrambled, the U and V components of an YUV colour scheme are modified according to a linear, invertible, parameterized transform, such as:

$$Um = f_0 * U + b$$

$$Vm = 255 * (1-f_0) + f_0 * V - b$$

where U and V stand for the original values of the U and V components of a particular pixel, and Um and Vm are the modified pixel values for the U and V components. The value of the multiplying factor $f_o$ should be between 0.5 and 0.9, depending on the required degree of obfuscation, with a smaller value giving more obfuscation of the image. The value for the addition factor b can be anywhere from 0 to $255*(1-f_o)$. Different values for $f_o$ and b can be chosen for different blocks, frames or different group of frames. During the descrambling process, the above transformation is reversed to get the original U and V values. A transform manipulation of this type, using linear transformations of pixel colour values, can also be used independently as a video encryption technique, for example without the additional use of the reordering techniques described herein.

Transform manipulations of individual blocks 172 in addition to the reordering of the blocks can provide additional complexity for a brute force distortional removal attack, but the manipulations can be implemented efficiently with knowledge of the relevant aspects of the mapping scheme.

Figure 6:
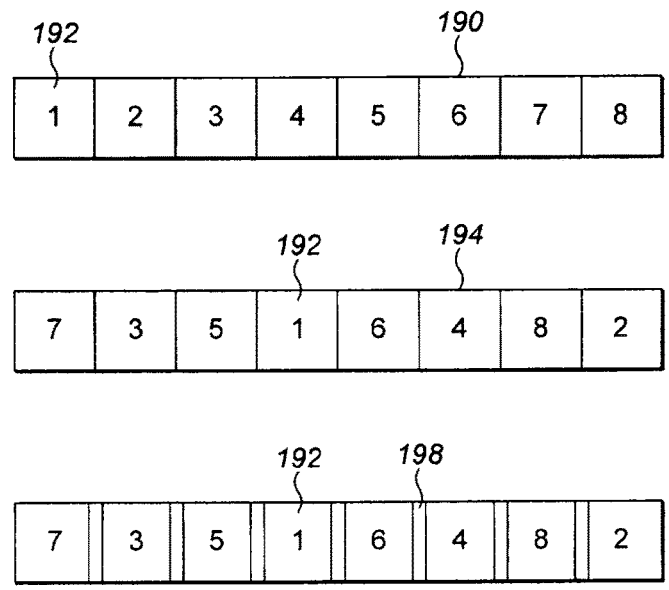
FIG. 6 illustrates scrambling of an audio stream.

FIG. 6 shows how a mapping scheme as discussed above can be applied to the content when the content is audio data. Frame 190 shows a series of audio data blocks 192 in an original arrangement, and frame 194 shows the same blocks following reordering according to a suitable mapping scheme. A frame of audio data could, for example, correspond to a particular time segment or interval. Frame 196 shows same frame with overlapping boundaries 198 added in the manner already discussed above, in order to minimise audio encoding and decoding artifacts arising from the reordering of the blocks 192. Manipulations such as rotations and mirroring can be applied to the audio data blocks in a similar manner as for video blocks.

Figure 7:
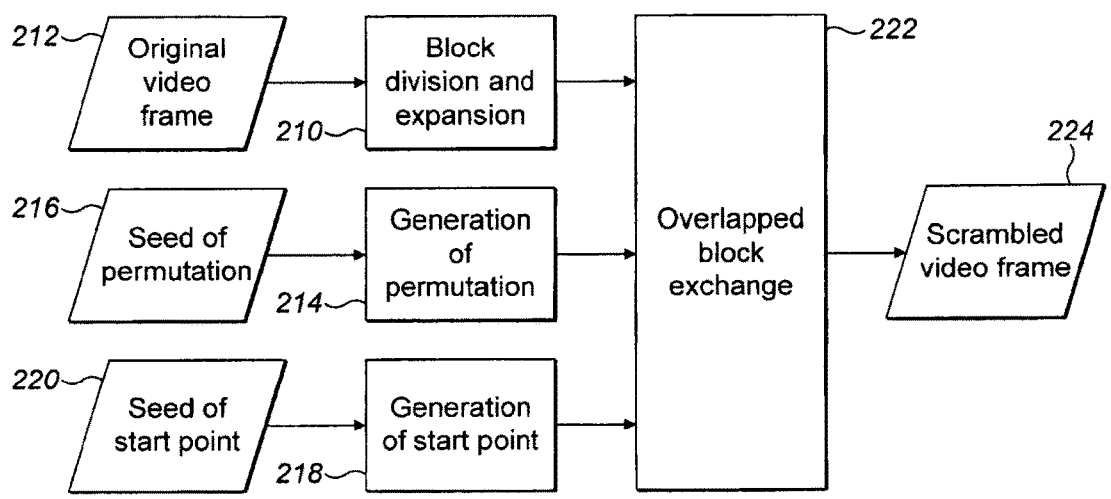
FIG. 7 shows steps which may be used to carry out the scrambling process.

Ways in which the above embodiments can be implemented will now be described in more detail. FIG. 7 shows an implementation of a scrambling process, for example as implemented by scrambler 12 shown in FIGS. 1 and 2A. The process proceeds with the following stages:

1. A block division and expansion step 210 divides each original video frame 212 into blocks with the size of $(SB_x-N) \times (SB_y-M)$ pixels. For each block, the block division and expansion step 210 expands any of the blocks four edges to generate overlapped blocks of size $SB_x \times SB_y$, where N=R+L, M=T+B, L=left overlap width, R=right overlap width, T=top overlap height, and B=bottom overlap height. The video frame is expanded so that the overlapped blocks will not overlap each other in the scrambled frame;

2. A generation of permutation step 214 generates a permutation from a seed of permutation 216. This seed 216 or the material to generate this seed 216 is transmitted to the receiver side for use in the descrambling process. This seed could be newly generated once for each video frame, once per interrelated video sequence, once per video, or most commonly somewhere in between these options.

3. A generation of start point step 218 generates a random start point for block exchanging based on a seed of start point 220. This seed of start point 220 is also transmitted to the receiver side for use in the descrambling process;

4. A step of overlapped block exchange 222 is used to reorder the overlapped blocks and to carry out manipulations such as flipping and rotating according to the permutation and random start point, which together define the mapping scheme. This step may typically be carried out at the same time as the expansion of the video frame in step 1 above;

5. The scrambled video frames 224 generated in step 4 are output.

Note that as already discussed above, the blocks do not need to be of regular shape and/or size. The values for L, R, T, and B can be different to each other, but must be communicated to, derived by, or known by the descrambler at the receiver.

Figure 8:
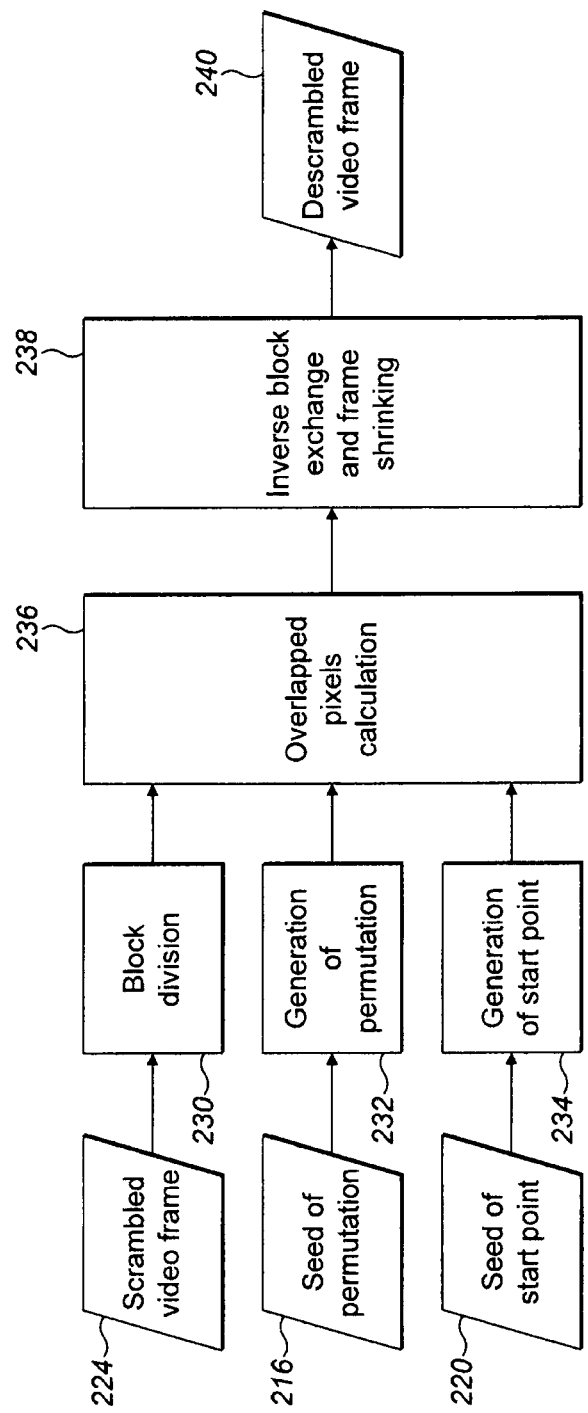
FIG. 8 shows steps which may be used to carry out the descrambling process.

The scrambled video frames 224 usually undergo encoding, for example including compression, before transmission to the receivers 50. At the receivers 50 the compressed video is first decoded (typically involving decompression) and is then descrambled. FIG. 8 shows an implementation of a suitable descrambling process, for example as implemented by descrambler 62 shown in FIGS. 1 and 2B. The process proceeds with the following stages:

1. The scrambled video frame 224 is divided into blocks of size $SB_x \times SB_y$ pixels by block division step 230;

2. The permutation is generated by a generation of permutation step 232 from the pre-defined seed of permutation 216, which is the same as step (2) for the above scrambling process;

3. The random start point for block reordering is generated by a generation of start point step 234, using the seed of start point 220, which is the same as step (3) for the above scrambling process;

4. The pixel values in the overlapped areas are calculated using an overlapped pixels calculation step 236;

5. Using the permutation and random start point which together indicate the mapping scheme, an inverse block exchange and frame shrinking step 238 reorders the blocks back to the original arrangement, reverses manipulations carried out on the blocks in the scrambling stage, and shrinks the frame size to the original size by suitable removal of overlap pixels;

6. The descrambled video frames 240 generated in step 5 are then output.

In a variation on the process of FIG. 8 inverse block exchange step is carried out before a subsequent step of overlapped pixels calculation and frame shrinking.

Note that the above operations may be performed in a single operation, in multiple stages, using multiple memory buffers or multiple interaction points with the receiver platform decoding and rendering capabilities to frustrate attempts to retrieve descrambled frames or reverse engineer the descrambling process.

Figure 9:
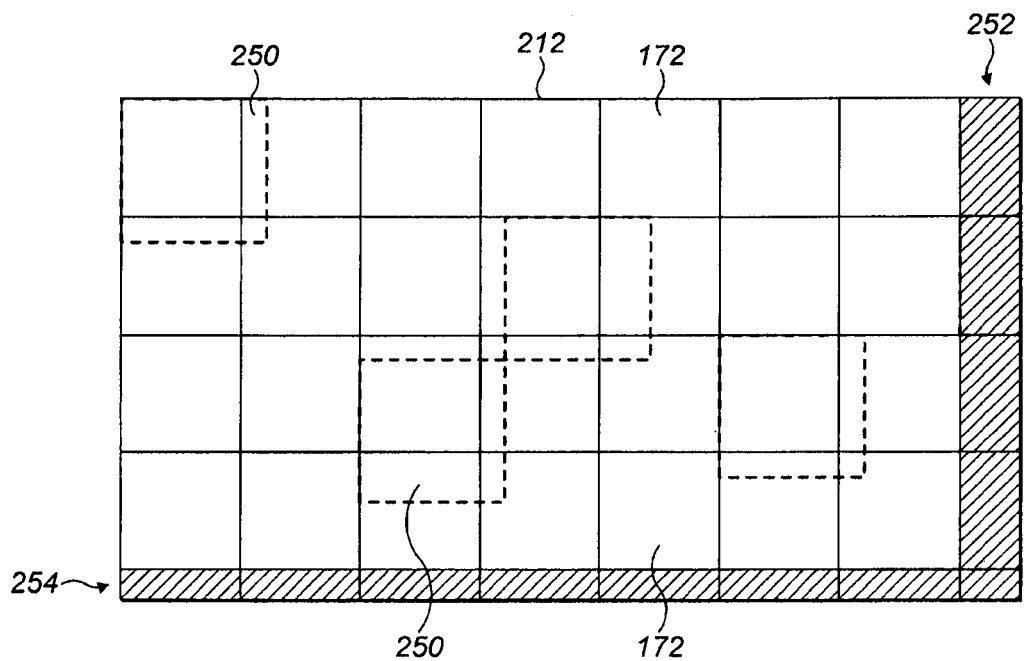
FIG. 9 is used for discussion of overlapping regions added to blocks as part of the scrambling process in order to reduce edge artifacts following encoding and decoding, and to illustrate the handling of frame edges.

In the above scrambling process, each original video frame is first divided into non-overlapped blocks of size $(SB_x-N) \times (SB_y-M)$ pixels. These blocks are then expanded by N and/or M pixels to make them overlap with their adjacent blocks. In FIG. 9, an exemplary original video frame 212 divided into blocks 172 is illustrated, in which some of the overlapping regions 250 of expanded overlapping blocks in the original frame are shown in dashed lines. The expansions shown here are in the right and bottom sides of each block, by way of example, although the expansion may be carried out at any number of sides of each block. Each of the expanded blocks overlaps with other expanded blocks by N rows or M columns of pixels. Every block, including those that may not be reordered from the original arrangement in the scrambling process, should be expanded in order to keep the scrambled frame to preserve the shape and aspect ratio of the expanded frame.

As already discussed, the frame is scrambled by reordering locations of the blocks within the frame (and optionally between frames), and also optionally by applying transform manipulations to each expanded block, such as re-orientation. However, the expanded blocks do not overlap each other in the scrambled frame; they are adjacent. This means that the pixels in overlapped areas appear 2 or 4 times in the scrambled frame. Therefore, the size of the scrambled frame is larger than the original frame. Edges of the image 252, 254 in the direction in which blocks are overlapping are left unscrambled with at least N×M pixels and resulting blocks with size less than $SB_x \times SB_y$, such as, bottom and right edge parts in FIG. 9, are left unchanged.

In order to be compression-friendly when using MPEG and similar types of encoding schemes using macroblocks, the size SB of the expanded blocks including their overlapping regions should preferably be divisible by the macroblock size, and the starting point for block division should fall on a multiple of the macroblock size in both x and y directions. For H.264 coding and compression the macroblock size is 16 pixels in each direction, so $SB_x$ and $SB_y$ should each therefore be a multiple of 16, for example 32, 48, 64, 80, and so on.

A video frame may be typically be made up of a number of separate components, for example the separate components such as colour and chrominance components found in YUV, Y'UV and other schemes (including YCbCr), and for separate field components of interlaced video.

For YUV type schemes, the block size may depend on the colour sampling format. If the video is in 4:4:4 colour format, all Y, U, and V components have the same size. The block sizes and scrambling steps may then be the same for all three components. If the video is in the 4:2:0 colour format, the block sizes for U and V component will be a quarter of those of Y component, and overlapping areas for both horizontal and vertical directions will be half of those for Y component.

For compressing the scrambled video, some video encoders may require that the size of the scrambled frame must be a multiple of the macro block size, for example a multiple of 16. If necessary, to achieve this the scrambled frame can be enlarged to a suitable size by padding, for example using a constant value or by copying the last column or row of data pixels.

An advantage of the described overlapped block exchange technique is that it efficiently reduces blocking artifacts. A potential shortcoming is that the scrambled frame is larger than the original frame and, thus the data volume for compression could increase. For example, if the expanded blocks are 80 pixels square including an overlap area two pixels wide along all edges, and the video format is 720p (with the size of 1280×720), the data volume is increased by about 5% before data padding and about 7% after data padding. According to experiments carried out by the inventors, however, following compression the size of the video is only about 0.2% greater than before scrambling.

An exemplary technique of implementing the permutation of FIGS. 7 and 8, or to otherwise implement the block reordering described above according to a mapping scheme will now be described. This technique makes use of a space filing curve, and in this particular example a Hilbert curve which scans every pixel of an image of size $2^m \times 2^n$. The Hilbert curve never maintains the same direction for more than three consecutive pixels. Other options for implementing the permutation include using a randomized space filling curve or a randomized block permutation.

Figure 10:
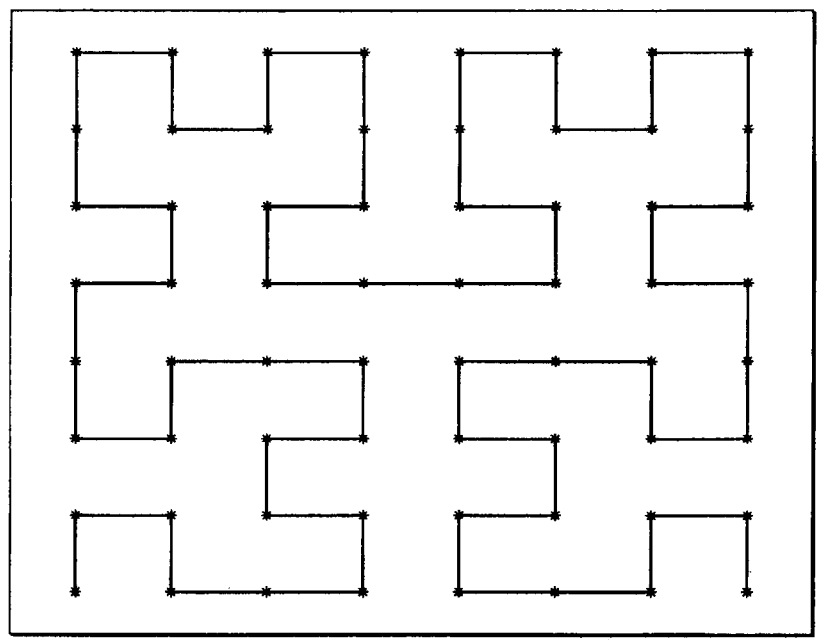
FIG. 10 illustrates a space filling curve which may be used to generate a permutation to define a mapping for the scrambling and descrambling processes.

FIG. 10 shows an example of an order 3 Hilbert space filing curve. Using the present technique, the particular form of the space filing curve to be used in the mapping scheme can be defined by the seed of permutation 216 shown in FIGS. 7 and 8. Each point on the space filling curve then represents an expanded block of pixels. The mapping scheme then dictates that each block exchanges location with one, and only one, of its two neighbouring blocks on the curve. Any one point on the curve can be chosen as the starting point for block exchange, and this point can be defined by the seed of start point 220.

Various other algorithms for reordering the blocks as part of the scrambling and descrambling process, for example including non-adjacent, randomized block exchanges, will be apparent to the skilled person.

FIG. 8 included a step of inverse block exchange and frame shrinking 238. This step includes reordering of the blocks from the scrambled arrangement back to the original arrangements, and bringing the expanded blocks including the overlapping areas back to their original sizes. Rather than simply discarding the overlapped areas, more sophisticated schemes can be used which make use of the data in the overlapped areas. According to one such scheme, the final descrambled value of each pixel in an area of overlap is determined by a weighted average of the corresponding pixels in the related expanded blocks. The overlapping of blocks is intended to reduce the video artifacts at the edges of blocks resulting from compression in the encoding stage, and to create a smooth transition from one block to another in the unscrambled video. To this end, weighting coefficients which vary with the location of the pixel may be used for determining the final pixel values. For example, a pixel closer to a block edge may be assigned a smaller weighting coefficient.

Figure 11:
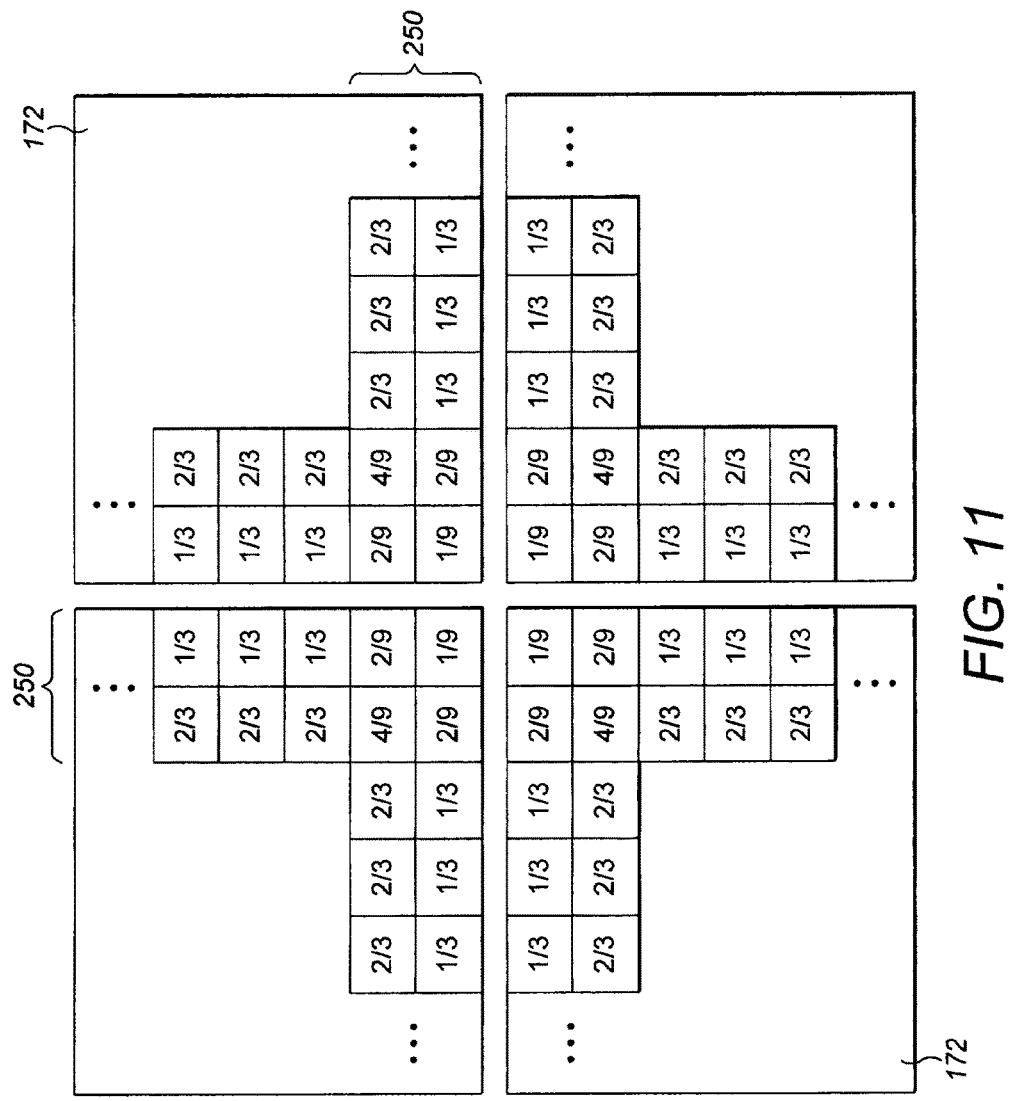
FIG. 11 illustrates weighting coefficients for use in reconciling, at the receiver, overlap and overlapped areas of blocks.

FIG. 11 shows an example of weighting coefficients for overlaps 250 between blocks 172 of 2 pixels wide and high. The weights for the pixels on the first and last columns (rows) in the expanded blocks is ⅓ and that on the second and second last columns (rows) is ⅔. The 4 pixels at each corner of an expanded block overlap 3 other expanded blocks. The weights for these corner pixels are 4/9, 2/9, 2/9, and 1/9, respectively.

The skilled person will appreciate that various alternative weighting schemes could be used and may be chosen, for example using overlap area widths and heights which are dynamically based on a seed input of the mapping scheme (for example the described seed of permutation) or on aspects or properties of the image data itself. It should also be clear to the reader that numerous configurations are possible where the descrambling block reordering, overlap operations, and image resizing are done in a single or multiple steps with single or multiple memory buffers.

For video using YUV type colour schemes, the descrambling steps to recover the original U and V components may be the same as that used to recover the Y component, by using a weighted averaging to determine the pixel values in the overlapped areas. If the video is in a 4:4:4 colour format, the U and V weighting coefficients can be also the same as those used for Y component. If it is in 4:2:0 format, each block in U and V components has only one column (row) overlapping for the example shown in FIG. 11. In this case, the weight for the corner pixels in the expanded blocks is 0.25. The weight for the other overlapped pixels is 0.5.

Another method for recovering U and V components from scrambled video frames using YUV or similar formats is to up-sample U and V components to the same size as the Y component. Then, the same method and weighting coefficients can be applied to all Y, U, and V components. Down-sampling can then be applied to reduce the size to half of Y component for 4:2:0 format data.

As well as or instead of using a weighting scheme as described above to combine pixels from overlap regions of adjacent blocks, a deblocking filter may used to further remove blocking distortion. However, it is not necessarily required. According to one such deblocking filter, a pixel in the unscrambled output video frame is calculated as the weighted average of all the pixels within a filter window, for example as can be represented by the following equation:

$$\text{reconstructed}[n] = \sum_i^L \sum_j^N F[i](Wa[N-j] \cdot a[N-j] + Wb[j] \cdot b[j])$$

where L is the filter length, N is overlapped area length, F[i] is filter factor, Wa[n] and Wb[n] are overlapped weighting factors, and a[n] and b[n] are the adjacent block pixels. If a pixel a[n] or b[n] is not in the overlapped area, their weights are 1.

Figure 12:
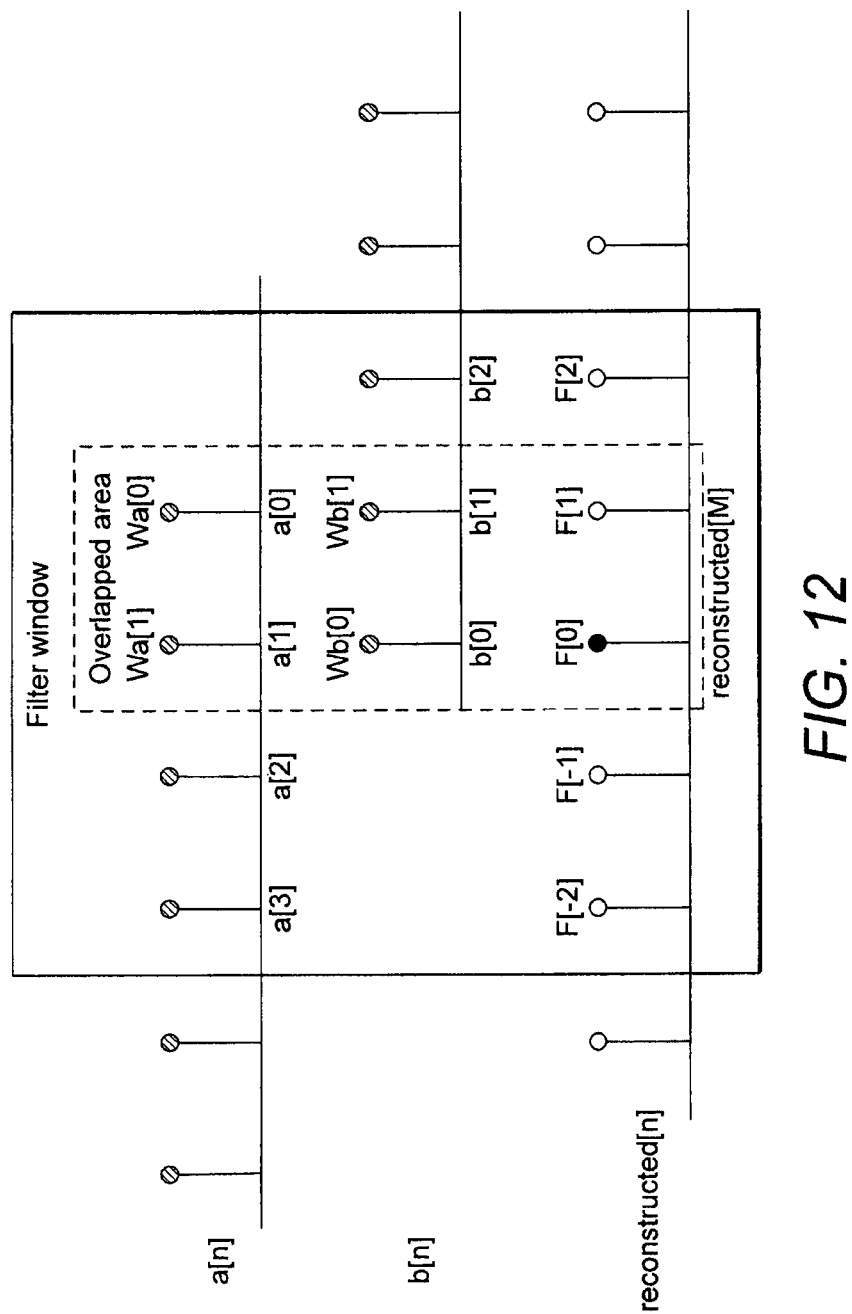
FIG. 12 shows an example pixel calculation from adjacent block overlap areas using a deblocking filter.

FIG. 12 shows an example pixel calculation from adjacent block overlap areas using such a deblocking filter. A first block a[n] is adjacent with an adjacent second block b[n] with both blocks having a mutual two pixel overlap. The weights for overlapping reconstruction are represented with Wa[n] and Wb[n] for the two blocks respectively. The weights for the deblocking filter are represented with F[n]. The length of deblocking filter window is 5 pixels in this example. The pixel reconstructed[M] is therefore calculated with the following equation:

reconstructed[M]=F[−2]·a[3]+F[−1]·a[2]+F[0]·(Wa [1]·a[1]+Wb[0]·b[0])+F[1]·)Wa[0]·a[0]+Wb[1]·b [1])+F[2]·b[2]

In some circumstances, a scrambled frame transmitted from the source to the receiver needs to have the same size as the original frame of content data. For example, many tablet computer devices are unable to process video with a pixel resolution greater than 1080p, in which case to send 1080p video to such a device acting as the receiver, the scrambled frame size cannot exceed the original frame size. In these and other circumstances, there are various options available to reduce the size of the scrambled content, for example to keep frame sizes in the scrambled content the same size as in the unscrambled content.

The following discussion assumes that a frame of the original, unscrambled content can hold a maximum of W columns and H rows of expanded blocks of size $SB_x \times SB_y$. A first option for not exceeding the original frame size is then to down-sample the original frame before scrambling.

After a descrambling process as described above, up-sampling is applied to the descrambled image to return to the original frame size. In the context of FIGS. 7 and 8, this solution can be carried out by adding to the process of FIG. 7 a down-sampling step to the original video frame before the step of block division and expansion 210, and by adding to FIG. 8 an up-sampling step after the step of inverse block exchange and frame shrinking 238.

A second solution is to locally down-sample border areas of the original frames before scrambling, for example by horizontally down-sampling the first (W−1)×N columns and the last (W−1)×N columns, and vertically down-sampling the first (H−1)×M rows and the last (H−1))×M rows, in which case the down-sampling rate is 2:1. Low-pass filtering should be applied to these columns and rows before the down-sampling is carried out. With this local down-sampling, the size of the frame is reduced to W×(SB−N)+N columns and H×(SB−N)+N rows of pixels. The size of the scrambled frame is then the same as that of the original frame. After the descrambling process described above, up-sampling is applied to the border areas to reconstruct the columns and rows of pixels that were down-sampled. The downsampling and upsampling can be achieved by adding to the process of FIG. 7 a down-sampling step to the original video frame before the step of block division and expansion 210, and by adding to FIG. 8 an up-sampling step after the step of inverse block exchange and frame shrinking 238.

A third option is to crop, from the original frame, the first (W−1)×N/2 columns, the last (W−1)×N/2 columns, the first (H−1))×M/2 rows, and the last (H−1))×M/2 rows of pixels. Here, N is the number of columns (M is rows) that a block overlaps with its adjacent block. The cropped frame is then scrambled using the techniques described above. As the cropped frame has W×($SB_x$−N)+N columns and H×($SB_y$−M)+M rows of pixels, it is divided into W×H blocks of size ($SB_x$−N)×($SB_y$−M) in the scrambling process. Thus, the scrambled frames have the same size as the original frames.

The content scrambling techniques described above were tested using some 1080p HD video sequences with pixel colours encoded using a YUV format. The sizes of the blocks including overlap areas was $SB_x$=112 and $SB_y$=112 pixels. The overlapped border areas around each block were two pixels wide in all directions. A 3-order space filling curve was chosen for the permutation, with 8×8 points. There was no extra deblocking filter applied to enhance the video quality. The scrambled frame size was larger than the original video, with no subsampling applied to reduce this effect. An ffmpeg encoder with an x264 codec was used to encode and decode the target video, with a maximum bitrate of 12 Mbps, and average bitrate of 5 Mbps.

The peak signal to noise ratios (PSNRs) of the decoded and descrambled video sequences were calculated and compared each other to examine the impact of the scrambling technique on the compression efficiency. The test results are shown in tables 1 and 2 set out below. It will be seen that the PSNR drops caused by the scrambling are negligible for all of the Y, U and V components.

It will be understood that variations and modifications may be made to the described embodiments without departing from the scope of the invention as defined in the appended claims. For example, it is to be understood that any feature described in relation to any one embodiment may be used alone, or in combination with other features described in respect of that or other embodiments.

TABLE 1

| | Video (1080p) | Size | File size before compression (kilo Bytes) | File size after compression mp4 (kilo Bytes) | Encoded scrambled video file size increased % | Compression bitrate (kilo bits per second) |
|---|---|---|---|---|---|---|
| Pedestrian area | Original video | 1920 × 1080 | 559872 | 4410 | — | 4897 |
| | Scrambled video with colour | 1968 × 1104 | 586621 | 4455 | 1.02% | 4946 |
| | Descrambled video with colour | 1920 × 1080 | 559872 | — | — | — |
| | Scrambled video without colour | 1968 × 1104 | 586621 | 4433 | 0.52% | 4922 |
| | Descrambled video without colour | 1920 × 1080 | 559872 | — | — | — |
| Station | Original video | 1920 × 1080 | 559872 | 4383 | — | 4866 |
| | Scrambled video with colour | 1968 × 1104 | 586621 | 4458 | 1.71% | 4949 |
| | Descrambled video with colour | 1920 × 1080 | 559872 | — | — | — |
| | Scrambled video without colour | 1968 × 1104 | 586621 | 4456 | 1.67% | 4947 |
| | Descrambled video without colour | 1920 × 1080 | 559872 | — | — | — |

TABLE 2

| | | PSNR with original video | | | PSNR with encoded original video | | |
|---|---|---|---|---|---|---|---|
| | Video (1080p) | psnrY (dB) | psnrU (dB) | psnrV (dB) | psnrY (dB) | psnrU (dB) | psnrV (dB) |
| Pedestrian area | Original video | 40.42 | 44.54 | 46.27 | — | — | — |
| | Descrambled video with colour | 39.99 | 43.14 | 44.49 | 41.41 | 45.36 | 45.69 |
| | Descrambled video without colour | 39.97 | 44.17 | 45.85 | 41.40 | 46.79 | 47.44 |
| Station | Original video | 40.92 | 44.70 | 44.89 | — | — | — |
| | Descrambled video with colour | 40.34 | 43.34 | 43.33 | 41.41 | 45.54 | 45.55 |
| | Descrambled video without colour | 40.36 | 44.30 | 44.37 | 41.44 | 47.07 | 47.00 |

The invention claimed is:

1. A method of processing digital content comprising:
scrambling the digital content, the scrambling comprising;
dividing the digital content into blocks that are ordered within the digital content according to an original arrangement,
reordering the blocks from the original arrangement to a scrambled arrangement to reposition the blocks within the scrambled digital content, and
carrying out, for each block of a plurality of the blocks, a different respective transform manipulation on content within said block of the plurality of blocks, wherein the transform manipulations comprise movements, within a block, of digital content within a block;
compressing the scrambled digital content with the blocks ordered in the scrambled arrangement; and
outputting the compressed scrambled digital content.

2. The method of claim 1 wherein the digital content comprises a series of frames, the dividing divides each frame into groups of one or more blocks, the groups persisting across the series of frames, and the compressing is carried out using a separate compression process for each group of one or more blocks.

3. The method of claim 1 wherein the scrambling comprises dividing the digital content into blocks in a manner that results in at least some of the blocks including at least one overlap area containing digital content from at least one respective adjacent block which is adjacent according to the original arrangement.

4. The method of claim 3 wherein the blocks including one or more overlap areas are sized to correspond to a macroblock for use in subsequent compression of the scrambled digital content.

5. The method of claim 1 wherein the digital content is audio content.

6. The method of claim 1 wherein the digital content is video content comprising a plurality of video frames, and the scrambling comprises dividing each video frame into a plurality of said blocks.

7. The method of claim 6 wherein each block corresponds to a contiguous plurality of pixels of a video frame.

8. The method of claim 1 further comprising, after outputting the compressed scrambled digital content, delivering the scrambled digital content to a receiver, and providing the receiver with descrambling information enabling the receiver to descramble the scrambled digital content.

9. A method of processing digital content comprising:
receiving the digital content as compressed scrambled digital content in which blocks of the digital content originally ordered within the digital content according to an original arrangement have been reordered before receiving to a scrambled arrangement to reposition the blocks within the scrambled digital content;

decompressing the received scrambled digital content;

descrambling the decompressed scrambled digital content, the descrambling comprising reordering the blocks back to their original arrangement, wherein, for each block of a plurality of the blocks, a different respective transform manipulation was applied to content within said block of the plurality of the blocks of the received scrambled digital content before being received and the descrambling further comprises reversing said transform manipulation, wherein said transform manipulation comprises movements, within a block, of digital content within a block; and outputting the reordered blocks in their original arrangement.

10. The method of claim 9 wherein the digital content comprises a series of frames, each frame is divided into groups of one or more of said blocks, the groups persisting across the series of frames, and the decompressing is carried out using a separate decompression process for each group of one or more blocks.

11. The method of claim 9 wherein at least some of the blocks of the received scrambled digital content include at least one overlap area containing digital content derived from at least one respective adjacent block which was adjacent according to the original arrangement, the method further comprising modifying the received blocks to remove the overlap area before outputting the reordered blocks in their original arrangement.

12. The method of claim 11 further comprising modifying the digital content of each respective adjacent block by combining the digital content the respective adjacent block with digital content of a corresponding overlap area.

13. The method of claim 9 wherein the digital content is video content comprising a plurality of video frames, and each of the plurality of blocks corresponds to a contiguous area of a video frame.

14. The method of claim 9 further comprising receiving descrambling information, wherein the descrambling the digital content is carried out in accordance with said descrambling information.

15. Apparatus comprising one or more computer processors operatively coupled to at least one memory device storing instructions which, when executed by the one or more computer processors, cause the one or more computer processors to process digital content by:

scrambling the digital content, the scrambling comprising;

dividing the digital content into blocks that are ordered within the digital content according to an original arrangement, reordering the blocks from the original arrangement to a scrambled arrangement to reposition the blocks within the scrambled digital content, and the scrambling further comprising carrying out, for each block of a plurality of the blocks, a different respective transform manipulation on content within said block of the plurality of the blocks, wherein the transform manipulations comprise movements, within a block, of digital content within a block;

compressing the scrambled digital content with the blocks ordered in the scrambled arrangement; and outputting the compressed scrambled digital content.

16. A non-transitory computer readable medium storing a computer program which, when executed by one or more processors, causes the one or more processors to process digital content by:

scrambling the digital content, the scrambling comprising dividing the digital content into blocks that are ordered within the digital content according to an original arrangement and reordering the blocks from the original arrangement to a scrambled arrangement to reposition the blocks within the scrambled digital content, the scrambling further comprising carrying out, for each block of a plurality of the blocks, a different respective transform manipulation on content within said block of the plurality of the blocks, wherein the transform manipulations comprise movements, within a block, of digital content within a block;

compressing the scrambled digital content with the blocks ordered in the scrambled arrangement; and outputting the compressed scrambled digital content.

17. A non-transitory computer readable medium storing a computer program which, when executed by one or more processors, causes the one or more processors to process digital content by:

receiving the digital content as compressed scrambled digital content in which blocks of the digital content originally ordered within the digital content according to an original arrangement have been reordered before receiving to a scrambled arrangement to reposition the blocks within the scrambled digital content;

decompressing the received scrambled digital content;

descrambling the decompressed scrambled digital content, the descrambling comprising reordering the blocks back to their original arrangement, wherein, for each block of a plurality of the blocks, a different respective transform manipulation was applied to content within said block of the plurality of the blocks of the received scrambled digital content before being received and the descrambling further comprises reversing said transform manipulation, wherein said transform manipulation comprises movements, within a block, of digital content within a block; and outputting the reordered blocks in their original arrangement.

18. Apparatus comprising one or more computer processors operatively coupled to at least one memory device storing instructions which, when executed by the one or more processors, cause the one or more processors to process digital content by:

receiving the digital content as compressed scrambled digital content in which blocks of the digital content originally ordered within the digital content according to an original arrangement have been reordered before receiving to a scrambled arrangement to reposition the blocks within the scrambled digital content;

decompressing the received compressed scrambled digital content;

descrambling the decompressed scrambled digital content, the descrambling comprising reordering the blocks back to their original arrangement, wherein, for each block of a plurality of the blocks, a different respective transform manipulation was applied to content within said block of the plurality of the blocks of the received scrambled digital content before being received and the descrambling further comprises reversing said transform manipulation, wherein said transform manipulation comprises movements, within a block, of digital content within a block; and outputting the reordered blocks in their original arrangement.

19. The apparatus of claim 18 wherein the digital content comprises a series of frames, each frame is divided into groups of one or more of said blocks, the groups persisting across the series of frames, and the decompressing comprises using a separate decoding process for each group of one or more blocks.

20. The apparatus of claim 18 wherein at least some of the blocks of the received scrambled digital content include at least one overlap area containing digital content derived from at least one respective adjacent block which was adjacent according to the original arrangement, the descrambling further comprising modifying the received blocks to remove the overlap area.

* * * * *